US009551457B2

(12) United States Patent
Johns et al.

(10) Patent No.: US 9,551,457 B2
(45) Date of Patent: Jan. 24, 2017

(54) POST MOUNTING SYSTEM AND APPARATUS

(71) Applicants: ONESTEEL WIRE PTY LIMITED, Sydney, New South Wales (AU); Gallagher Group Limited, Hamilton (NZ)

(72) Inventors: Graham Johns, Hamilton (NZ); Robert Wade, Hamilton (NZ); Robert Fabien, New South Wales (AU); Lawrence O'Toole, New South Wales (AU)

(73) Assignees: ONESTEEL WIRE PTY LIMITED, Sydney (AU); Gallagher Group Limited, Hamilton (NZ)

( * ) Notice: Subject to any disclaimer, the term of this patent is extended or adjusted under 35 U.S.C. 154(b) by 0 days.

(21) Appl. No.: 14/770,595

(22) PCT Filed: Feb. 24, 2014

(86) PCT No.: PCT/AU2014/000169
§ 371 (c)(1),
(2) Date: Aug. 26, 2015

(87) PCT Pub. No.: WO2014/131077
PCT Pub. Date: Sep. 4, 2014

(65) Prior Publication Data
US 2016/0003409 A1    Jan. 7, 2016

(30) Foreign Application Priority Data

Feb. 26, 2013  (AU) ................................ 2013900652
Apr. 11, 2013  (AU) ................................ 2013203633

(51) Int. Cl.
*A47B 96/00*     (2006.01)
*F16M 13/02*     (2006.01)
(Continued)

(52) U.S. Cl.
CPC ................ *F16M 13/02* (2013.01); *A01K 3/00* (2013.01); *E04H 17/10* (2013.01);
(Continued)

(58) Field of Classification Search
USPC ................ 248/220.31, 220.41, 224.8, 218.4, 219.3, 248/219.1
See application file for complete search history.

(56) References Cited

U.S. PATENT DOCUMENTS 9,200,654 B1 *   12/2015  Parduhn ................ F16B 7/0493
2004/0046162 A1 *  3/2004  Zhu ..................... E04H 17/1439
                                                       256/65.03
(Continued)

FOREIGN PATENT DOCUMENTS

GB    2187771 A       9/1987
WO    2005/075764 A1  8/2005
WO    2013/040654 A1  3/2013

OTHER PUBLICATIONS

PCT/AU2014/000169 International Search Report dated Apr. 22, 2014 (3 pages).
(Continued)

*Primary Examiner* — Steven Marsh
(74) *Attorney, Agent, or Firm* — Michael Best & Friedrich LLP

(57) ABSTRACT

Disclosed is an apparatus (10) for connection to a flange (52) of a post (50). The flange (52) comprises two or more elongated apertures (54) therethrough which are spaced out along the length of the flange. The apparatus comprises a body (12) from which there extends two sets of projections (14A&B) and (16A&B). Each projection in each set respectively extends from the body to a distal end (18). Each of the sets (14), (16) comprises two projections A&B which extend from the body so as to define a recess R therebetween which is configured to receive the flange (52) therein. The distal
(Continued)

ends (18) of the two projections (14) or (16) in a given set are able to locate in adjacency of a respective one of the elongated apertures (54) in the flange. At least one of the distal ends of at least one the projections comprises a passage (20) formed thereat. The passage (20) has a profile configured in a similar manner to that of the flange elongated aperture (54) adjacent to which it can be located in use. A respective pin (32A), (32B) is provided for each of the projections. The pins are connected together by a bridging member (34). When the passage (20) is located in adjacency of a respective flange aperture (54), the pins (32A), (32B) are each able be inserted through a respective passage (20) aligned with a respective aperture (54) to secure the apparatus (10) to the post.

27 Claims, 9 Drawing Sheets

(51) Int. Cl.
*A01K 3/00* (2006.01)
*E04H 17/10* (2006.01)
*E04H 17/14* (2006.01)
*E04H 17/22* (2006.01)
*E04H 17/24* (2006.01)
*A01G 17/06* (2006.01)
*H01B 17/14* (2006.01)

(52) U.S. Cl.
CPC ......... *E04H 17/1434* (2013.01); *E04H 17/22* (2013.01); *E04H 17/24* (2013.01); *A01G 17/06* (2013.01); *H01B 17/145* (2013.01)

(56) References Cited

U.S. PATENT DOCUMENTS

| | | | | |
|---|---|---|---|---|
| 2004/0208722 | A1* | 10/2004 | Kuenzel | F16B 13/0833 411/340 |
| 2006/0180723 | A1* | 8/2006 | Kiser | H02G 7/05 248/218.4 |
| 2011/0233355 | A1* | 9/2011 | Peng | A47B 88/044 248/218.4 |
| 2011/0233497 | A1 | 9/2011 | Forge | |
| 2012/0119043 | A1* | 5/2012 | Rataiczak, III | A47B 96/061 248/218.4 |

OTHER PUBLICATIONS

PCT/AU2014/000169 International Preliminary Report on Patentability dated Feb. 16, 2015 (9 pages).

\* cited by examiner

POST MOUNTING SYSTEM AND APPARATUS

TECHNICAL FIELD

A post mounting system and apparatus are disclosed which enable items to be secured to a post, for example, a strand, a reflector, etc. The system and apparatus can be employed in applications such as fencing, electric fencing, demarcation, signage, retention, barricades, etc. The post can include two or more apertures or holes through e.g. a flange of the post to enable attachment of the apparatus thereto. The apertures or holes may be elongated. The apparatus when attached to the post can enable various items to be secured at the post (e.g. such as fence wire, electric fence wire, reflectors, signage, panels, etc). The post can take the form of a picket (e.g. that comprises a "stalk" flange and one or more other elongate flanges projecting from the stalk). However, the system is to be broadly interpreted, in that the post can form a rail, a cross-member, a strut, a stay, a channel, etc in the system.

BACKGROUND ART

Posts used in applications such as fencing, demarcation, signage etc are usually formed from steel, though in some applications (e.g. electric fencing) it is known to mould such posts from a plastic material.

Steel fence posts have been known for many years that are roll-formed to have a Y-shaped or T-shaped profile (i.e. in end view). The post may take the form of a picket and in this case may be provided (e.g. cut) with a pointed end to facilitate post driving into the earth.

Such steel fence posts are usually provided with a series of spaced holes in a flange thereof (i.e. in the so-called "stalk", "stem" or "base web") to enable strands of fencing wire to be secured to the post, usually by tying each wire strand to the post with a separate short length of wire tie, or by employing a wire "clip". However, the wire can also be threaded directly through such holes. These holes are typically punched into an already roll-formed post in a separate step.

In addition (or as an alternative) to the series of holes, the posts can be provided with a series of spaced passages that are usually machined to project right into the stalk from a distal edge thereof. These passages enable a strand of fencing wire to be moved into and retained in the passage, thereby securing the wire directly to the post. Again, these passages are typically machined into an already roll-formed post in a separate step.

It is known that such holes and passages in the stalk decrease the bend strength of a post, and can promote points/regions of post failure as well as points/regions for corrosion of fencing wire (e.g. when the wire is threaded through the holes or located in the passages). The holes and passages can also provide sharp catch points.

In addition, the existing systems for attaching wire to a fence post present a high degree of manual labour, and some of the ties employed also require the services of a skilled fencer.

WO 2011/020165 to the present applicant discloses a post mounting system and device in which the device is designed to secure to the post immediately upon assuming its desired location therealong.

Some posts have holes punched in the stalk which are elongate rather than round which increases the strength of the stalk but allows a smaller cross sectional aperture for a post mounting system to fix to. Also known fixing methods for fixing to a round hole in the stalk of a post often result in a loose fitting attachment where a round pin can easily rotate in the round hole.

The above references to the background art do not constitute an admission that the art forms a part of the common general knowledge of a person of ordinary skill in the art. The above references are also not intended to limit the application of the system and apparatus as disclosed herein.

SUMMARY OF THE DISCLOSURE

Disclosed is an apparatus for connection to a post. The apparatus can be suitable for attachment to a T-post or Y-post, where one of the flanges of the post comprises two or more apertures therethrough, spaced out along the length thereof. For example, the two or more apertures may be elongated (e.g. slot-like).

In one form the apparatus comprises a body from which there extends two sets of projections. Each projection in each set respectively extends from the body to a distal end. Each of the sets comprises two projections which extend from the body so as to define a recess therebetween which is configured to receive the flange therein. The distal ends of the two projections in a given set are able to locate in adjacency of a respective one of the elongated apertures in the flange (i.e. on opposing sides thereof).

In this one form of the apparatus, at least one of the distal ends of at least one of the projections comprises a passage formed thereat that has a profile configured in a similar manner to that of the flange elongated aperture adjacent to which it can be located in use.

This similar configuring of the passage can facilitate mounting of the projection to the elongated aperture (e.g. it can make optimal use of the elongated aperture to enhance mounting of the apparatus to the post).

In one embodiment each of the distal ends of each of the projections may comprise a passage formed therethrough. Further, in this embodiment each passage may have a profile that is configured to match that of the elongated flange aperture adjacent to which it can be located in use. This configuring of each such passage may further enhance the use of the elongated aperture in mounting of the apparatus to the post.

In one embodiment passages at the distal ends of each of the sets of projections may be configured to receive and secure thereat a respective pin. For example, each pin may be provided with a profile (e.g. in a cross-section therethrough) that is configured in a similar manner to that of the elongated flange aperture through which it can extend in use. Thus the pin profile can be seen to work with the similar passage and aperture configurations in the mounting of the apparatus to the post.

In one embodiment, when a pin is provided for each of the first and second sets of projections, the pins may be connected together by a bridging member. For example, the bridging member may connect the pins together at respective heads thereof. In addition, the bridging member may comprise a plastic moulding which may be formed at the same time as the two pins.

When moulded of plastic, the bridging member may comprise a plastic moulding having a rigid (e.g. structural) characteristic so as to maintain one pin in a fixed orientation relative to the other pin. This can aid in reliable insertion of the pins. For example, both pins may be readily lined up with the passages in the projections prior to inserting the pins therethrough.

Alternatively, the bridging member may comprise a plastic moulding having a flexible characteristic (e.g. such as a tie or tether) so as to allow the pins to move relative to each other. For example, this can allow one pin to be inserted/removed before/after the other, and can provide more manoeuvrability to the apparatus in use.

In one embodiment, each pin may comprise a barbed end. The barbed end may be adapted such that the pin is able to deform while being inserted into the passages and through the flange aperture. However, the barbed end may also be adapted such that the pin is able to reform once the barb has passed through the passages and aperture.

In one embodiment, each pin may be provided with a profile (e.g. in cross-section) that is configured such that, when inserted through passages at the distal ends of a respective set of projections, the pin engages interferingly with at least one of the passages to secure the pin thereto. In this regard, each pin may be inserted by a push-, interference-, friction-, snap- or press-fit.

Also disclosed herein is apparatus for connection to a flange of a post. Again, the apparatus can be suitable for attachment to a T-post or Y-post, where one of the flanges of the post comprises two or more holes therethrough, spaced out along the length thereof.

In one form the apparatus comprises a body from which there extends at least two projections. Each projection extends from the body to a distal end which is able to locate in adjacency to a respective one of the holes in the flange.

In this form, the apparatus also comprises a respective pin for each of the projections, with the pins being connected together by a bridging member.

In accordance with this form of the apparatus each distal end of each projection comprises a passage formed thereat which is able to be located in adjacency of a respective flange hole. Thus, in use, the pins are each able be inserted through a respective passage aligned with a respective hole to secure the apparatus to the post.

The bridging member may be as defined above. For example, the bridging member may connect the pins together at respective heads thereof. In addition, the bridging member may comprise a plastic moulding which may be formed at the same time as the two pins. The bridging member may be rigid or flexible as set forth above.

In this form of the apparatus, one or more of the flange holes may be circular, elongate, etc. The aperture may otherwise be as defined above.

In one embodiment, each of the passages, adjacent flange apertures, and pin profiles may comprise round-cornered rectangles (e.g. matched in shape and configuration for maximum inter-operability).

In one embodiment, the flange of the post may comprise a stalk of Y- or T-post.

In one embodiment, the apparatus may be formed from injection moulding of a plastic material. For example, the plastic material may comprise a high density polyethylene, or other suitable high-strength plastic.

In one embodiment, a side of the body that opposes the projections may be provided with an attachment mechanism, such as a pin lock or W-connector for mounting an electric fence wire or another item to the post.

In another embodiment, the side of the body that opposes the projections may be provided with a sign or a reflector, which sign may e.g. be integrally moulded with the body. Alternatively, the sign or reflector can be adapted for independently mounting to the attachment mechanism (e.g. to the pin lock or W-connector).

Also disclosed herein is a post mounting system. The system comprises a post having at least one elongate flange. The flange comprises two or more holes or apertures therethrough. The holes or apertures are spaced out along the length of the flange.

The system also comprises apparatus for securing with respect to two of the holes or apertures of the flange of the post (e.g. an adjacent two holes or apertures). The apparatus can be as defined above. In this regard, at least one of the distal ends of at least one the projections of the apparatus can comprise a passage formed thereat that has a profile configured in a similar manner to that of the flange hole or aperture. Additionally or alternatively, the apparatus may comprise a respective pin for each of the projections, with the pins being connected together by a bridging member.

In one embodiment, the system may comprise at least two such apparatus, each for securing with respect to a respective two holes or apertures of the flange. Further, the post flange may comprise at least two pairs of adjacent holes or apertures for each such apparatus.

BRIEF DESCRIPTION OF THE DRAWINGS

Notwithstanding that which has been described in the Summary, specific features of the system and apparatus will become apparent from the following description, which is given by way of example only, and with reference to the accompanying drawings in which.

DETAILED DESCRIPTION OF SPECIFIC EMBODIMENTS

Figure 1:
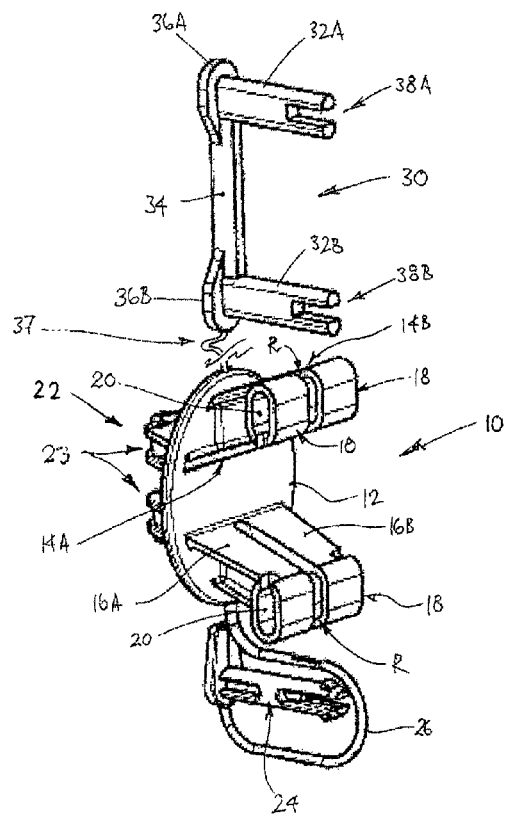
FIG. 1 shows an embodiment of apparatus for a post mounting system, the apparatus being depicted in an unattached condition.
Figure 2:
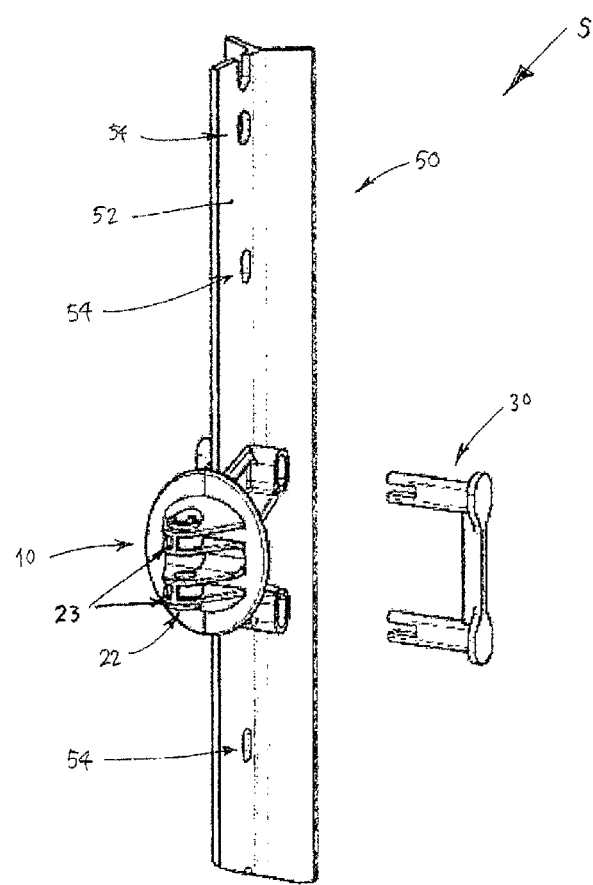
FIG. 2 shows the apparatus embodiment of FIG. 1 forming part of a post mounting system, with the apparatus ready to be mounted to a stem of a Y- or T-post.
Figure 3:
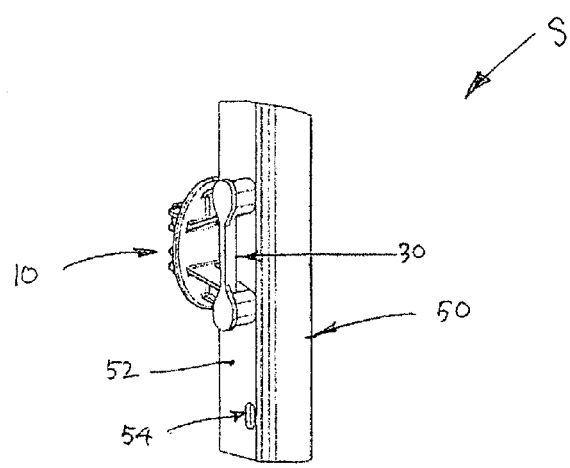
FIG. 3 shows the apparatus embodiment of FIGS. 1 and 2 forming part of a post mounting system, with the apparatus having been mounted to the stem of the Y- or T-post.

Referring firstly to FIG. 1 an apparatus for a post mounting system S is shown in the form of a connector 10. The connector 10 is particularly suited for attachment to a Y-post or T-post 50 (as shown in FIGS. 2 and 3), although it should be understood that the connector 10 can be adapted to other post formats. A number of such connectors 10 can be attached or mounted along the Y-post or T-post 50.

The connector 10 comprises a body in the form of an oval-shaped base plate 12. Two sets of projections in the form of upper and lower paired fingers 14A,B and 16A,B are formed to extend laterally from a face of the base plate 12. However, in a simpler form, just a single upper finger and a single and lower finger can be provided to extend laterally from the base plate 12.

At a distal end of each finger 14 or 16 a guide boss 18 is formed, with the guide bosses of each of the upper paired fingers 14A,B and each of the lower paired fingers 16A,B opposing each other. This enables a respective securing pin to be inserted therethrough, as explained hereafter.

In this regard, each of the guide bosses has a passage in the form of an elongate slot 20 that is formed to extend through the guide boss 18. In accordance with the present disclosure, at least one (and typically all) of the slots 20 has a profile configured in a similar manner to that of a corresponding hole or aperture in the Y- or T-post 50, as explained hereafter. This configuring of the slot profile can aid with mounting of the connector 10 to the Y- or T-post 50.

Whilst the slots 20 are shown as enclosed, they could for example be partially open along one side, by providing a cut-away in the guide boss 18. Also, just one of the slots 20 can have a profile configured in a similar manner to that of a corresponding hole or aperture in the Y- or T-post 50, with this being sufficient to secure the connector 10 to the Y- or T-post 50.

Between each of the upper paired fingers 14A,B and between each of the lower paired fingers 16A,B a respective recess R is defined. As will be explained hereafter with reference to FIGS. 2 and 3, each recess R is configured (e.g. closely spaced) to receive therein, in a nesting manner, a flange 52 (e.g. a stem or stalk) of the Y- or T-post 50. As will also be explained, the guide boss 18 at the distal end of each the fingers 14A,B and 16A,B is able to locate in adjacency of a respective one of holes or apertures in the flange (i.e. on opposing sides thereof).

When the connector 10 is to be used in a wire/strand mounting application, an opposite side of the base plate 12 can be provided with a wire or strand attachment mechanism. In the embodiment shown in FIGS. 1 to 3, the attachment mechanism takes the form of a pin lock 22 having spaced-apart pin supports 23 for mounting an electric fence wire or like item to the Y- or T-post 50. In this regard, a locking pin 24 can be tethered 26 to a lower end of the base plate 12 and can be inserted through the pin supports 23.

Figure 5:
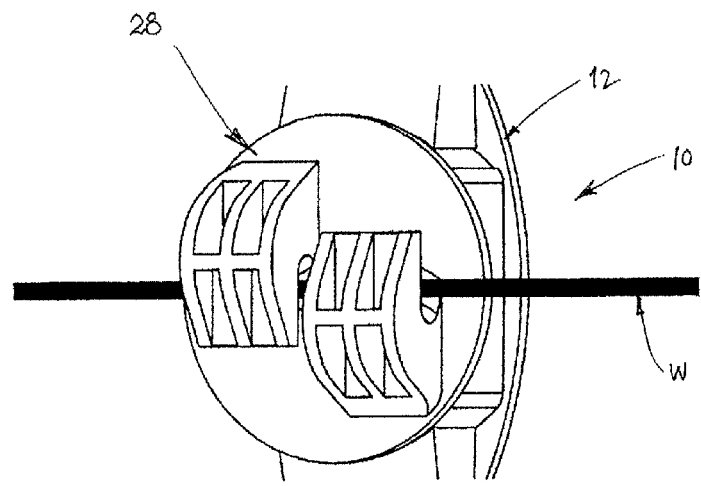
FIG. 5 shows a detail of a modified apparatus to the embodiment of FIGS. 1 to 3 to illustrate a W-connector arrangement.

In the embodiment shown in FIG. 5, the attachment mechanism takes the form of a W-connector 28 for mounting an electric or non-electric fence wire W or like item to the Y- or T-post 50.

It should be noted that other forms of attachment mechanism for mounting different articles to the post may be employed.

Figure 6:
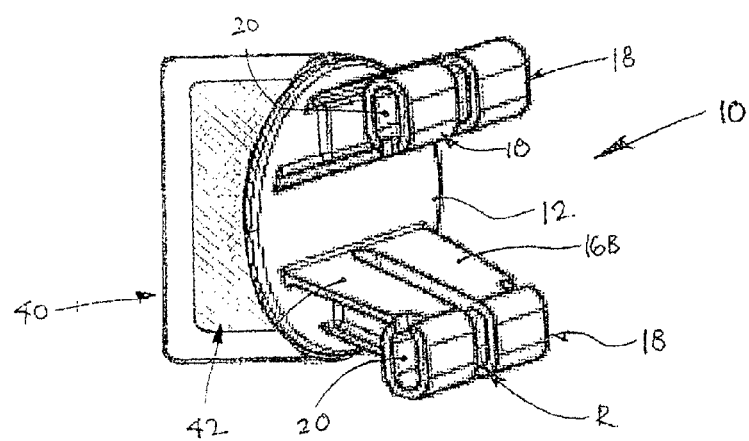
FIG. 6 shows another embodiment of apparatus for a post mounting system, the apparatus being depicted in an unattached condition and comprising a first reflector arrangement.
Figure 7:
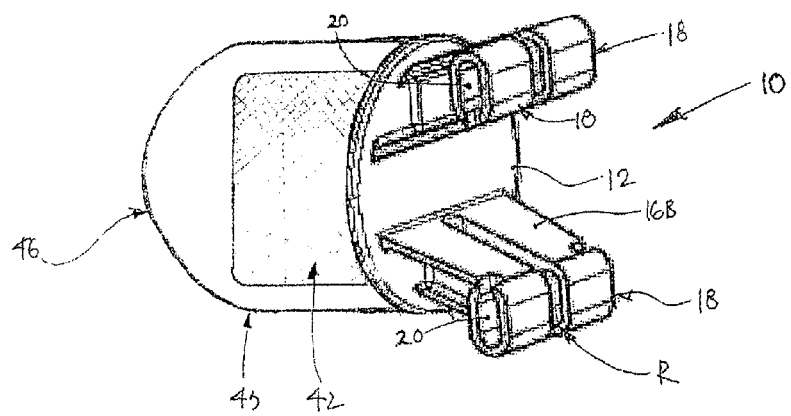
FIG. 7 shows another embodiment of apparatus for a post mounting system, the apparatus being depicted in an unattached condition and comprising a second reflector arrangement.

When the connector 10 is to be used in signage- or alert-type applications, an opposite side of the base plate 12 can be modified to have extending therefrom a generally rectangular plate 40 (FIG. 6) or a plate 45 with curved outer edge 46 (FIG. 7). For example, each plate 40 and 45 can be integrally formed (e.g. moulded) with the base plate 12. Whilst each plate 40 and 45 may function as a sign, in the embodiments shown in FIGS. 6 and 7, the plates 40 and 45 each take the form of a reflector having a light reflective surface 42 formed on one or both sides thereof. A series of such reflectors may thus be mounted along a post 50.

In another mode, when the connector 10 is again to be used in signage- or alert-type applications, a reflector (or the like) can be supplied that makes use of the existing attachment mechanism (e.g. pin lock 22 or W-connector 28) of the connector 10, such that the reflector, etc can be indirectly and independently mounted to the Y- or T-post 50.

Figure 8:
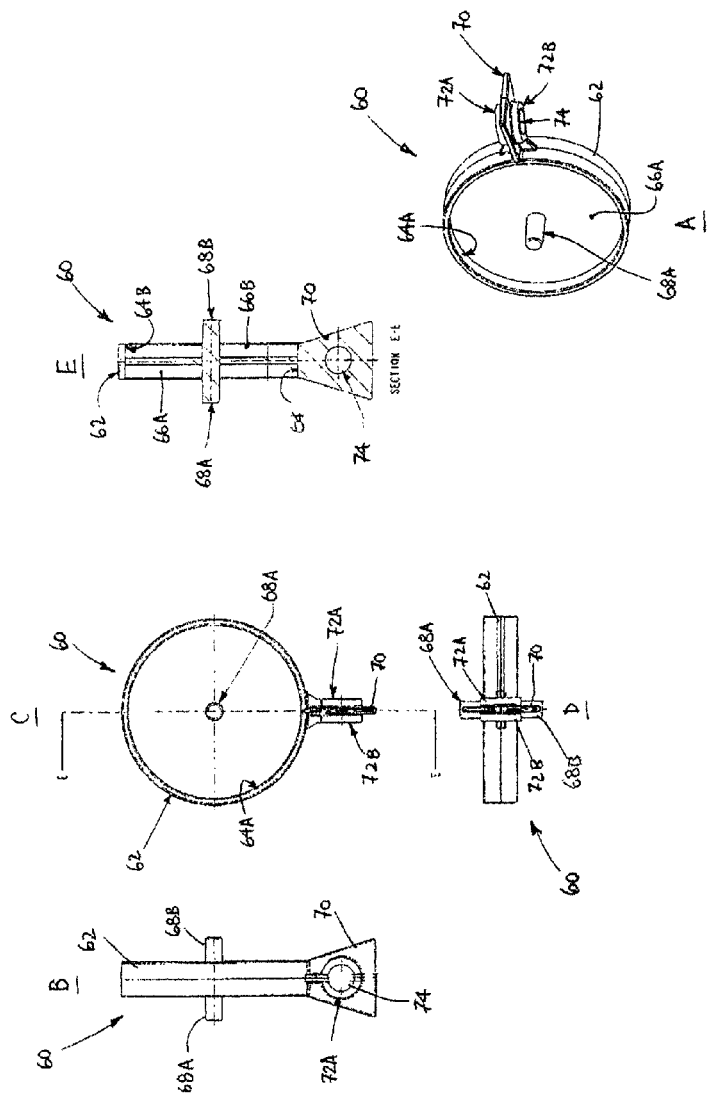
FIGS. 8A to 8E respectively show perspective, plan, front, end and sectional views of an independently locatable reflector embodiment for use with apparatus for a post mounting system.

For example, as shown in FIG. 8, a first independently mountable reflector 60 comprises a circular reflector base 62. Opposing annular-shaped recesses 64A and 64B are defined in opposite sides of the reflector base 62. Respective annularly-shaped reflector elements 66A and 66B are able to be affixed in these recesses (e.g. adhesively; press-, push- or interference-fit; etc). The reflector elements can be formed from a known, highly light reflective material (e.g. a moulded, light-scattering metal-polymer composite, etc). Opposing locating spigots 68A and 68B are centrally formed in each of the recesses 64A and 64B, the spigots protruding beyond central recesses of the annularly-shaped reflector elements 66A and 66B, as best shown in FIGS. 8A, 8B & 8E.

The reflector base 62 has a mounting plate 70 integrally formed to extend laterally therefrom, the plate 70 being rotated by 90° out of the plane of the reflector base 62. Upper and lower pin-supporting hollow bosses 72A and 72B are integrally formed with the plate 70 to respectively project up and down in use of the reflector 60. The bosses 72A and 72B are sized so as to snugly locate for secure mounting in the space between the pin supports 23 of pin lock 22. Thus, when the pin 24 is inserted through the pin supports 23, it is also inserted through aligned holes 74 of the bosses 72A, 72B to thereby lock the reflector 60 to the connector 10.

Figure 9:
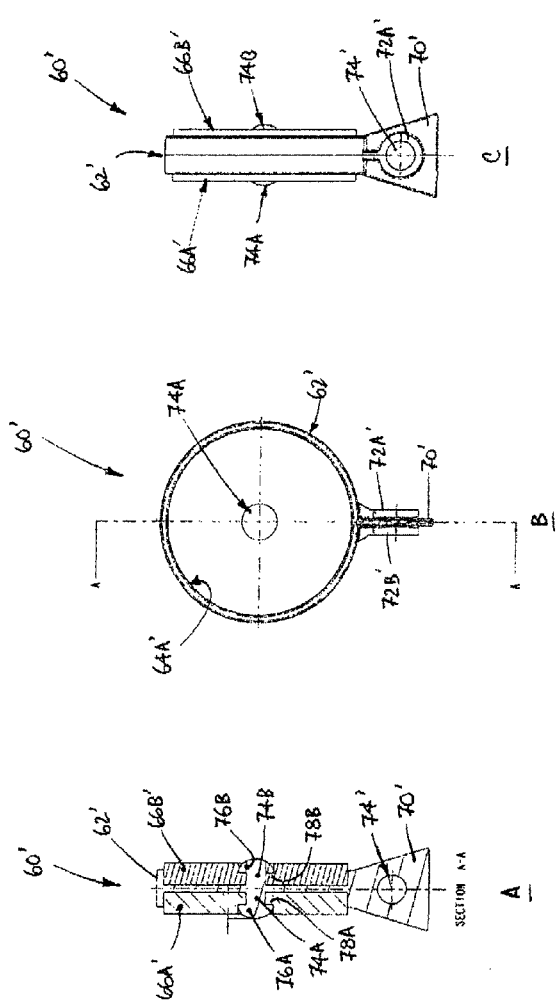
FIGS. 9A to 9C respectively show sectional, front and plan views of another independently locatable reflector embodiment for use with apparatus for a post mounting system.

FIG. 9 shows a second independently mountable reflector 60', with similar or like parts to the reflector 60 being numbered using the same reference numerals, but with a prime' added.

The second reflector 60' differs from the first reflector 60 in that, instead of employing opposing locating spigots 68A and 68B, it comprises opposing locking pegs 74A and 74B that respectively comprise rounded, enlarged heads 76A and 76B. The respective annular reflector elements 66A' and 66B' each comprise a corresponding stepped recess 78A and 78B into which the enlarged heads 76A and 76B are able to respectively locate (see FIG. 9A). In this regard, each reflector element 66A' or 66B' is pushed onto its respective peg 74A or 74B, causing its respective head 76A or 76B to deform, and until that head snap-locks into its corresponding stepped recess 78A or 78B. Other than this, the form and function of reflector 60', including its mounting to connector 10, is essentially the same as for reflector 60.

The reflectors 60, 60' can be moulded from suitable polymers, and can have a shape and configuration quite different to that shown in FIGS. 8 and 9. Also, the plate 70 or 70' can be modified to make it suitable for connection to the W-connector 28 of FIG. 5 (e.g. by having opposing protruding latches that hook behind the W-connector). Again, a series of such reflectors 60, 60' may, together with respective connectors 10, be mounted along a post 50.

Returning to the connector 10, a dual pin device 30 is provided as part of the post mounting system S. The pin device 30 can be used to connect the connector 10 to the Y- or T-post 50. In accordance with the present disclosure, the pin device 30 comprises two pins 32A and 32B that are connected together by a bridging member. In the embodiment of FIGS. 1 to 3, the bridging member takes the form of a connection bit 34. Further, in the embodiment of FIGS. 1 to 3 the connection bit 34 connects the pins 32A and 32B together at respective heads 36A and 36B thereof. The pin device 30 is employed to connect the connector 10 to the Y- or T-post 50 by inserting the pins 32A and 32B through respective slots 20 of guide bosses 18 when they are located in adjacency of (i.e. aligned) with respective holes or apertures in the flange 52 of the Y- or T-post 50.

The dual pin device 30 can be moulded of plastic, including the connection bit 34, which may be formed at the same time as the two pins 32A and 32B. The connection bit 34 may be moulded to have a rigid (e.g. structural) characteristic so as to maintain one pin in a fixed orientation relative to the other pin to aid in reliable insertion of the pins 32A and 32B (i.e. both pins may be readily lined up with their respective slots 20).

In an alternative embodiment, the connection bit 34 may be moulded at the same time as the two pins 32A and 32B but to have a flexible characteristic (e.g. such as a tie or tether) so as to allow the pins 32A and 32B to be moved relative to each other. This can allow one pin to be inserted before or removed before the other (and vice versa) and thus provide more manoeuvrability to the connector 10 in use. The dual pin device 30 may also be tethered 37 to (e.g. to an upper end of) the base plate 12 for pin security.

Figure 4:
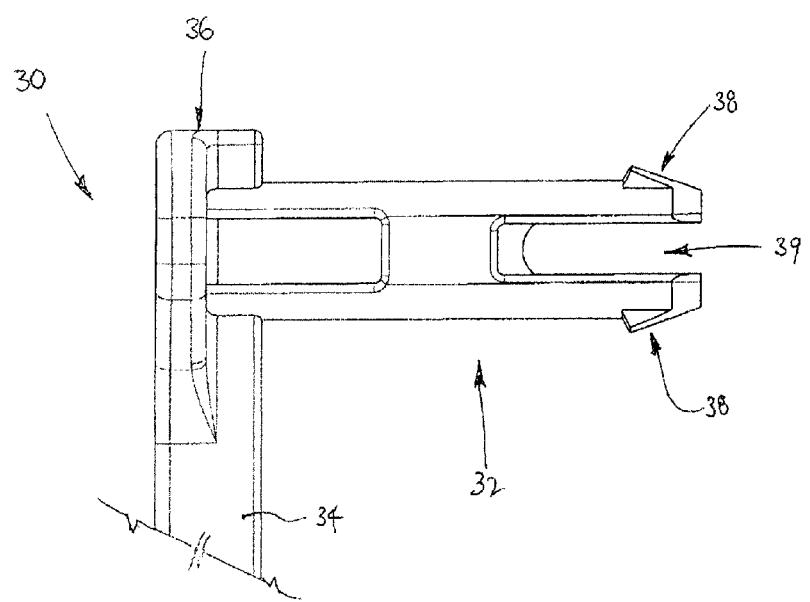
FIG. 4 shows a detail of the pin device for the apparatus and system embodiment of FIGS. 1 to 3.

As best shown in FIG. 4, and in greater detail, each pin 32A or 32B comprises a respective barbed end 38A or 38B. Each pin 32A or 32B also comprises a channel 39A or 39B formed to extend into the pin from the barbed ends 38A and 38B. Each channel 39 enables the pin 32 to deform while being inserted into the slots 20 and through the flange hole or aperture 54. However, once fully inserted the barbed ends 38A and 38B are able to reform, thereby securing the connector 10 to the Y- or T-post 50.

Each pin 32A and 32B can have a cross-sectional profile that is configured in a similar manner to that of the slots 20 and the hole or aperture in the flange 52 through which it is inserted in use. Thus, the pin profiles can cooperate with the similar slot and hole/aperture configurations when mounting of the connector 10 to the Y- or T-post 50.

For example, each pin 32A and 32B may be provided with a cross-sectional profile that is configured to engage interferingly with at least one of the slots 20 and/or hole or aperture of flange 52 to further secure the pin thereto. In this regard, each pin may be inserted into one or both slots 20 and/or the flange hole or aperture by a push-, interference-, friction-, snap- or press-fit.

Referring now to FIGS. 2 and 3, a post mounting system S comprising the connector 10 and a specially adapted Y- or T-post 50 will now be described. FIG. 2 shows the connector 10 of FIG. 1 located on the flange 52 of the Y- or T-post 50, but with the dual pin device 30 shown not inserted. In this regard, the flange 52 nests snugly within the recesses R defined between the opposing upper paired fingers 14A,B and lower paired fingers 16A,B.

In system S the flange 52 of the Y- or T-post 50 is provided with a series of apertures spaced out along the length thereof in the form of post slots 54. FIG. 2 also shows that the upper and lower paired fingers 14A,B and 16A,B of connector 10 are located in adjacency of two adjacent post slots 54.

FIG. 3 also shows the connector 10 of FIG. 1 located on the flange 52 of the Y- or T-post 50, but now with the connector 10 secured to the flange 52, the dual pin device 30 having been inserted into place as shown.

Each post slot 54 is elongate, having the form of a rectangle with rounded corners. This configuration of the slots 54 can specially adapt the Y- or T-post 50 whereby the bending moment of the post is increased. However, it can also better adapt the post for the mounting of connectors thereto, such as connector 10.

In this regard, the slots 20 in the guide bosses 18 and the cross-sectional profiles of the pins 32A and 32B can each be configured in a similar manner (e.g. matched for maximum inter-operability) to that of the slots 54 (e.g. rectangle with rounded corners), so that their adjacency can easily be visually detected and sensed in use. In addition, non-round (i.e. non-circular) pins and flanges holes (i.e. in which the pins can otherwise easily rotate in use) can be avoided, and insertion of the dual pin 30 in only two orientations (upright and inverted) is promoted. However, it should be understood that the slots 20 and pin cross-sectional profiles can also be modified to be used with round (or other shaped) flange holes.

In any case, the similar configuring of the slots 20, pin cross-sectional profiles and slots 54 can better facilitate mounting of the connector 10 to the Y- or T-post 50.

The connector 10 and dual pin device 30 can each be formed by injection moulding of a plastic material. The plastic material can comprise a high density polyethylene or other suitable high-strength plastic.

At least some of the apparatus and system embodiments as set forth herein may provide at least some of the following advantages:

They are stronger than a prior art single pin attachment, for example, when the cross-section of the slot in the post being less than prior art holes.

There is less chance of losing pins, as the connected pin set is larger than a single pin or two single pins.

Faster installation and easier handling as the connected pins can align with both the slots/apertures at the same time.

Faster installation because one application of force inserts both pins at the same time (for example, by striking the connector 10 with a suitable tool such as a hammer).

More stability of the connector 10 on the post because two pin mounting positions prevents rotation around any one pin axis.

Significant increase in security of the pins in the slots/apertures as one pin cannot come straight out of its slot/aperture while being held in the aperture by the connector 10, which is fixed in position by its connection to the other pin. This can create a significant torque force required to be overcome for one pin to be extracted without the other pin.

Whilst a number of specific apparatus and system embodiments have been described, it should be appreciated that the apparatus and system may be embodied in other forms.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and system as disclosed herein.

The invention claimed is:

1. An apparatus configured to be connected to a flange that comprises a stalk of Y- or T-post, the flange comprising two or more elongated apertures therethrough, the apertures being spaced out along the length of the flange, the apparatus comprising:

a body from which there extends two sets of projections, with each projection in each set respectively extending from the body to a distal end;

each of the sets comprising two projections which extend from the body so as to define a recess therebetween which is configured to receive the flange therein, whereby the distal ends of the two projections in a given set are able to locate in adjacency of a respective one of the elongated apertures in the flange;

wherein at least one of the distal ends of at least one the projections comprises an elongate passage formed thereat that has a profile configured in a similar manner to that of the flange elongated aperture adjacent to which it can be located in use.

2. An apparatus as claimed in claim 1 wherein each of the distal ends of each of the projections comprises a passage formed therethrough, each passage having a profile that is configured to match that of the elongated flange aperture adjacent to which it can be located in use.

3. An apparatus as claimed in claim 1 further comprising pins, wherein passages at the distal ends of each of the sets of projections are configured to receive and secure thereat a respective pin.

4. An apparatus as claimed in claim 3 wherein each pin has a profile that is configured in a similar manner to that of the elongated flange aperture through which it is configured to extend in use.

5. An apparatus as claimed in claim 3 wherein, when a pin is provided for each of the first and second sets of projections, the pins are connected together by a bridging member.

6. An apparatus as claimed in claim 5 wherein the bridging member connects the pins together at respective heads thereof.

7. An apparatus as claimed in claim 5 wherein the bridging member comprises a plastic moulding which may be formed at the same time as the two pins.

8. An apparatus as claimed in claim 7 wherein the plastic moulding for the bridging member comprises a plastic moulding having:
 a rigid characteristic so as to maintain one pin in a fixed orientation relative to the other pin; or
 a flexible characteristic so as to allow the pins to move relative to each other.

9. An apparatus as claimed in claim 3 wherein each pin comprises a barbed end which is adapted such that the pin is able to deform while being inserted into the passages and through the flange aperture, but which is able to reform once the barb has passed through the passages and aperture.

10. An apparatus as claimed in claim 3 wherein each pin has a profile that is configured such that, when inserted through passages at the distal ends of a respective set of projections, the pin engages interferingly with at least one of the passages to secure the pin thereto.

11. An apparatus configured to be connected to a flange of a post, the flange comprising two or more flange holes therethrough, the flange holes being spaced out along the length of the flange, the apparatus comprising:
 a body from which there extends two sets of projections, with each projection in each set respectively extending from the body to a distal end, each of the sets comprising two projections which extend from the body so as to define a recess therebetween, the recess being configured to receive the flange therein,
 each distal end of each projection having therethrough a passage, each distal end of the two projections in a given set being arranged to locate in adjacency to a respective one of the flange holes;
 a respective pin for each of the sets of projections, with the pins being connected together by a bridging member;
 whereby, in use, a respective pin can be inserted through the passages in the distal ends of the two projections and also through the respective one of the flange holes that is located between the distal ends of the two projections.

12. An apparatus as claimed in claim 11 wherein the flange holes each take the form of an elongated aperture, and wherein at least one of the distal ends of at least one the projections comprises an elongate passage formed thereat that has a profile configured in a similar manner to that of the flange elongated aperture adjacent to which it can be located in use.

13. An apparatus as claimed in claim 3, wherein the two or more elongated apertures of the flange, to which the apparatus is configured to be connected, each take the form of a round-cornered rectangle, wherein each of the passages and pin profiles also comprise round-cornered rectangles.

14. An apparatus as claimed in claim 1 wherein the apparatus is formed from injection moulding of a plastic material.

15. An apparatus as claimed in claim 1 wherein a side of the body opposing the sets of projections is provided with:
 an attachment mechanism in the form of a pin lock or W connector for mounting an electric fence wire or another item to the post;
 a sign or reflector, optionally integrally moulded with the body.

16. An apparatus as claimed in claim 15 wherein the sign or reflector is adapted for independently mounting to the attachment mechanism.

17. A post mounting system comprising:
 a post having at least one elongate flange, the flange comprising two or more holes or apertures therethrough, the holes or apertures being spaced out along the length of the flange;
 apparatus for securing with respect to two of the holes or apertures of the flange of the post, the apparatus comprising:
 a body from which there extends two sets of projections, with each projection in each set respectively extending from the body to a distal end;
 each of the sets comprising two projections which extend from the body so as to define a recess therebetween which is configured to receive the flange therein, whereby the distal ends of the two projections in a given set are able to locate in adjacency of a respective one of the elongated holes or apertures in the flange;
 wherein at least one of the distal ends of at least one the projections comprises an elongate passage formed thereat that has a profile configured in a similar manner to that of the flange elongated hole or aperture adjacent to which it can be located in use.

18. A post mounting system as claimed in claim 17, the system comprising at least two such apparatus, each for securing with respect to the two holes or apertures of the flange, and the post flange comprising at least two pairs of adjacent holes or apertures for each such apparatus.

19. An apparatus as claimed in claim 1 wherein each of the projections in each of the sets extends laterally from the body such that the recess is defined as a plane between the projections, and wherein the elongate passage at the distal end of at least one of the projections extends perpendicularly with respect to the plane of the recess.

20. An apparatus as claimed in claim 11 wherein each of the projections extends laterally from the body, and wherein the passage at the distal end of each of the projections extends transversely with respect to the lateral extent of its respective projection.

21. An apparatus configured to be connected to a flange of a post, the flange comprising two or more elongated apertures therethrough that each takes the form of a round-cornered rectangle, the apertures being spaced out along the length of the flange, the apparatus comprising:

a body from which there extends two sets of projections, with each projection in each set respectively extending from the body to a distal end;

each of the sets comprising two projections which extend from the body so as to define a recess therebetween which is configured to receive the flange therein, whereby the distal ends of the two projections in a given set are able to locate in adjacency of a respective one of the elongated apertures in the flange;

two pins, wherein passages located at the distal ends of each of the sets of projections are configured to receive and secure thereat a respective pin; and wherein the passages at the distal ends of each of the projections are elongate and comprise a round-cornered rectangular profile that is configured in a similar manner to that of the flange elongated aperture adjacent to which it can be located in use.

22. An apparatus configured to be connected to a flange of a post, the flange comprising opposing generally planar surfaces, and two or more elongated apertures that each extend through the flange from one planar surface to the other, the apertures being spaced out along the length of the flange, the apparatus comprising:

a body from which there extends two sets of projections, with each projection in each set respectively extending from the body to a distal end;

each of the sets comprising two projections which extend from the body so as to define a recess therebetween which is arranged to receive the flange therein, whereby the distal ends of the two projections in a given set are arranged to locate at a respective one of the opposing generally planar surfaces in adjacency of a respective one of the elongated apertures in the flange;

wherein at least one of the distal ends of at least one of the projections comprises an elongate passage formed thereat that has a profile configured in a similar manner to that of the flange elongated aperture such that the elongate passage is arranged to face the elongated aperture at a respective one of the opposing generally planar surfaces in use.

23. An apparatus as claimed in claim 22, wherein the flange comprises a stalk of Y- or T-post.

24. An apparatus as claimed in claim 22 wherein each of the distal ends of each of the projections comprises a passage formed therethrough, each passage having a profile that is configured to match that of the elongated flange aperture adjacent to which it can be located in use.

25. An apparatus as claimed in claim 22 further comprising two pins, wherein passages located at the distal ends of each of the sets of projections are configured to receive and secure thereat a respective pin.

26. An apparatus as claimed in claim 25 wherein each pin has a profile that is configured in a similar manner to that of the elongated flange aperture through which it is configured to extend in use.

27. An apparatus as claimed in claim 25 wherein the pins are connected together by a bridging member.

\* \* \* \* \*